(12) United States Patent
Shi et al.

(10) Patent No.: US 9,896,616 B2
(45) Date of Patent: Feb. 20, 2018

(54) ACRYLONITRILE-BASED SULFUR SCAVENGING AGENTS AND METHODS OF USE IN OILFIELD OPERATIONS

(71) Applicant: Multi-Chem Group, LLC, San Angelo, TX (US)

(72) Inventors: Liu Shi, Houston, TX (US); Funian Zhao, Tomball, TX (US); Liangwei Qu, Spring, TX (US); Michael Harless, Humble, TX (US); Ron Hoppe, Calgary (CA)

(73) Assignee: Multi-Chem Group, LLC, San Angelo, TX (US)

( * ) Notice: Subject to any disclaimer, the term of this patent is extended or adjusted under 35 U.S.C. 154(b) by 0 days.

(21) Appl. No.: 15/100,917

(22) PCT Filed: Dec. 23, 2014

(86) PCT No.: PCT/US2014/072072
§ 371 (c)(1),
(2) Date: Jun. 1, 2016

(87) PCT Pub. No.: WO2016/105371
PCT Pub. Date: Jun. 30, 2016

(65) Prior Publication Data
US 2016/0355724 A1 Dec. 8, 2016

(51) Int. Cl.
*C09K 8/532* (2006.01)
*E21B 37/06* (2006.01)
(Continued)

(52) U.S. Cl.
CPC .............. *C09K 8/532* (2013.01); *C09K 8/54* (2013.01); *E21B 37/00* (2013.01); *E21B 37/06* (2013.01);
(Continued)

(58) Field of Classification Search
CPC ......... E21B 41/02; E21B 37/06; C09K 8/532; C09K 8/54; C09K 2208/32
See application file for complete search history.

(56) References Cited

U.S. PATENT DOCUMENTS

| 3,459,852 A | 8/1969 | Roehm |
| 3,488,294 A | 1/1970 | Annand et al. |

(Continued)

FOREIGN PATENT DOCUMENTS

| WO | 2014187566 A1 | 11/2014 |
| WO | 2015153286 A1 | 10/2015 |
| WO | 2016105341 A1 | 6/2016 |

OTHER PUBLICATIONS

Gershbein, Leon L., and Charles D. Hurd. "The reaction of hydrogen sulfide with acrylonitrile, acrylic ester and crotonaldehyde." Journal of the American Chemical Society 69.2 (1947): 241-242.

(Continued)

*Primary Examiner* — Catherine Loikith
(74) *Attorney, Agent, or Firm* — Tenley Krueger; Baker Botts L.L.P.

(57) ABSTRACT

Composition for the removal or inactivation of hydrogen sulfide or other species comprising ionizable sulfur (e.g., mercaptans, thiols, etc.) using compositions containing acrylonitrile and/or derivatives thereof are provided. Methods for the removal or inactivation of hydrogen sulfide or other sulfur species in oilfield sites and other related applications using compositions containing acrylonitrile and/or derivatives thereof are provided.

20 Claims, 2 Drawing Sheets

(51) Int. Cl.
*C09K 8/54* (2006.01)
*E21B 37/00* (2006.01)

(52) U.S. Cl.
CPC ...... *C09K 2208/20* (2013.01); *C09K 2208/32* (2013.01)

(56) References Cited

U.S. PATENT DOCUMENTS

| | | | |
|---|---|---|---|
| 4,647,397 | A | 3/1987 | Starkston et al. |
| 4,680,127 | A | 7/1987 | Edmonson |
| 8,357,306 | B2 | 1/2013 | Yang et al. |
| 2004/0010065 | A1 | 1/2004 | Kohara et al. |
| 2011/0000823 | A1 | 1/2011 | Hamad et al. |
| 2011/0315921 | A1 | 12/2011 | Ramachandran et al. |
| 2012/0149117 | A1 | 6/2012 | Lawrence et al. |
| 2012/0152857 | A1 | 6/2012 | Yang et al. |
| 2013/0004393 | A1 | 1/2013 | Menendez et al. |
| 2013/0092597 | A1 | 4/2013 | Stark et al. |
| 2013/0101473 | A1 | 4/2013 | Harless et al. |
| 2013/0153225 | A1* | 6/2013 | Livanec ............... C09K 8/04 166/300 |
| 2014/0057817 | A1 | 2/2014 | Janak |
| 2014/0166288 | A1 | 6/2014 | Bailey et al. |
| 2014/0224743 | A1 | 8/2014 | Janak |

OTHER PUBLICATIONS

International Search Report and Written Opinion issued in related PCT Application No. PCT/US2014/072072 dated Jul. 29, 2015, 10 pages.
International Preliminary Report on Patentability issued in related Application No. PCT/US2014/072072 dated Jul. 6, 2017 (7 pages).
Chemical Abstracts 1989:44617; Malinovskii et al, "Use of polyacrylonitrile-base chemisorbent fibers for extraction of harmful impurities from air and water", Izvestiya Vysshikh Uchebnykh Zavedenii, Khimiya i Khimicheskaya Tekhnologiya, 1989, vol. 32(3), pp. 76-79.
Office Action issued in related CA Application No. 2965625, dated May 24, 2017 (4 pages).
Office Action issued in related AU Application No. 2014414822, dated May 5, 2017 (7 pages).
Norwegian Search Report and Office Action issued in related Norwegian Application No. 20170505, dated Oct. 30, 2017, 6 pages.

* cited by examiner

ACRYLONITRILE-BASED SULFUR SCAVENGING AGENTS AND METHODS OF USE IN OILFIELD OPERATIONS

CROSS-REFERENCE TO RELATED APPLICATION

The present application is a U.S. National Stage Application of International Application No. PCT/US2014/072072 filed Dec. 23, 2014, which is incorporated herein by reference in its entirety for all purposes.

BACKGROUND

The present disclosure of this application relates to the removal or inactivation of hydrogen sulfide or other species comprising ionizable sulfur (e.g., mercaptans, thiols, etc.) which may be encountered in wells which penetrate subterranean formations such as oil wells, gas wells and the like. Fluids in sewage systems, fluids produced from wells and make-up fluids also frequently contain hydrogen sulfide. Hydrogen sulfide gas is toxic with a density heavier than air, and therefore removal or inactivation of this sulfide ion is necessary to prevent poisoning of surrounding personnel and contamination of the area. Moreover, hydrogen sulfide gas is highly corrosive to the pipeline and equipment used in the operation of an oil well. Therefore, removing hydrogen sulfide from produced fluid (i.e., oil and water) and gas is necessary for the safe production of oil.

Drilling a well in a hydrocarbon bearing subterranean formation for the production of hydrocarbons from said formation typically involves use of a drilling apparatus and drilling fluid. The drilling apparatus usually comprises a bit mounted on a string of hollow steel pipe. This hollow pipe is often used to rotate the bit to enable the bit to cut into the formation. The hollow pipe also acts as a conduit for the drilling fluid to be pumped down to the bottom of the hole, from where it rises to the surface via the annulus between the drill string and the borehole wall. The drilling fluid has many functions, one of the most important of which is to convey the cuttings from the bit downhole up to the surface of the well.

In drilling some subterranean formations, and often particularly those bearing oil or gas, hydrogen sulfide accumulations are frequently encountered. The drilling fluid brings the hydrogen sulfide to the surface. Such sulfide in the drilling fluid is problematic because it can corrode the steel in the drilling apparatus and may be liberated into the atmosphere as toxic sulfide gas at the well surface.

Generally, to protect the health of those working with the drilling fluid and those at the surface of the well, conditions should be maintained to ensure that the concentration of hydrogen sulfide above the fluid, emitted due to the partial pressure of the gas, is less than about 15 ppm.

Triazine-based hydrogen sulfide scavengers have been commonly used in the oil and gas industry, but triazine can increase pH values of produced water and cause scale problems. Acrolein is another common hydrogen sulfide scavenger because it can react with hydrogen sulfide at a fast rate. However, acrolein is highly reactive and toxic, which may create added difficulties for transportation, storage, and operation.

BRIEF DESCRIPTION OF THE FIGURES

These drawings illustrate certain aspects of some of the embodiments of the present disclosure, and should not be used to limit or define the disclosure.

While embodiments of this disclosure have been depicted and described and are defined by reference to example embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

Figure 1:
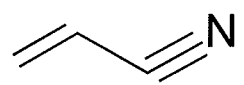
FIGS. 1 and 2 are diagrams illustrating the chemical structure of sulfur scavenging additives according to certain embodiments of the present disclosure.

The present disclosure of this application relates to the removal or inactivation of hydrogen sulfide or other species comprising ionizable sulfur using compositions containing acrylonitrile and related compounds. More specifically, the present disclosure provides acrylonitrile-based compounds for use as a sulfur scavenger in various operations. In certain embodiments, the acrylonitrile-based additive may interact with one or more sulfur species to reduce the amount of or inactivate (i.e., render the sulfur atoms in the sulfur species non-ionizable) at least a portion of the sulfur species present, The sulfur scavenging additives of the present disclosure may comprise any acrylonitrile-based compound known in the art. Acrylonitrile, shown in FIG. 1, is widely used in industry to prepare polyacrylonitrile and other copolymers. The acrylonitrile-based additives of the present disclosure may be less reactive than certain conventional H2S scavengers (such as acrolein), which, in certain embodiments, may make it less volatile, less toxic, easier to handle, and more stable to store for periods of time than acrolein. Also, acrylonitrile's lower reactivity may make acrylonitrile more suitable for combining with other additives in the drilling fluid.

In certain embodiments, the additives may include a compound of the general formula:

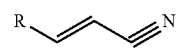

where R represents any atom or functional group that can increase the activity of the adjacent double bond, such as a hydrogen atom, alkyl groups, alkene groups, alkyne groups (any of which may be substituted, unsubstituted, linear, branched, cyclic, or acyclic), and any combination or derivative thereof. For example, in certain embodiments, R may comprise a C1 to C20 of any of the aforementioned structures comprising an ester group, an ether group, a carbonyl group, a carbonyl amide group, a urea group, a urethane group, or any combination thereof. In certain embodiments, the additive of the present disclosure may include a combination of different compounds having this formula.

The treatment fluids comprising additives of the present disclosure may be hydrophobic, hydrophilic, or mixtures thereof, and may also include a solvent. The solvent may be an aromatic solvent, such as Aromatic 100, Aromatic 150, kerosene, diesel, or mixtures thereof. The concentration of the solvent within the treatment fluid may be from about 1 to about 99 wt %. The concentration of the compound within the treatment fluid may be from about 1 to about 99 wt % of the treatment fluid. The treatment fluid may also include a corrosion inhibitor, a dehazer, and/or a conductivity improver.

Figure 2:
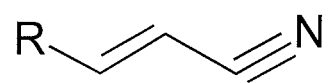

As used herein, the term "acrylonitrile" and "acrylonitrile-based additive" includes 2-propenenitrile (IUPAC) having the molecular formula $C_3H_3N$, as well as all derivatives thereof that are formed by substituting one or more H atom of 2-propenenitrile molecule with any R groups. For example, FIG. 1 shows acrylonitrile, which may be used in accordance with certain embodiments of the present disclosure. In addition, acrylonitrile derivatives can also be used in accordance with the present disclosure. FIG. 2 shows a generic acrylonitrile derivative, wherein R represents any atom or functional group that can increase the activity of the adjacent double bond such as hydrogen, alkyl groups, and alkene groups. Moreover, the H atoms shown in FIGS. 1 and 2 can be replaced with R groups (i.e., side chains). Any R group substitution is acceptable. In certain embodiments, larger, more complicated R groups may result in decreased reactivity of the sulfur scavenger. In addition, certain embodiments include hydrogen sulfide scavenging functionalities in the R groups such as acrylate.

In accordance with certain embodiments, a variety of suitable carrier fluids may be used to deliver the acrylonitrile. Acrylonitrile is typically oil soluble, and therefore, oil-based carrier fluids can be used in certain embodiments. However, in certain embodiments, acrylonitrile compositions used according to the present disclosure may be used in aqueous fluids (e.g., aqueous liquids) as well. In certain embodiments, the concentration of acrylonitrile used in the carrier fluid (or any fluid into which the acrylonitrile is introduced) may be from about 0.5% to about 15% by weight of the fluid. At high temperatures, concentrations in a different range may be used, among other reasons, for example, to avoid polymerization of the acrylonitrile monomers. In certain embodiments, the acrylonitrile-based additives of the present disclosure may be used at a neutral to slightly basic pH, among other reasons, because scale forms a higher pH and lower pH leads to acidic corrosion. However, a slightly acidic pH (e.g., around 5) is also suitable, though it may result in a slower reaction.

Acrylonitrile can be used as a sulfur scavenger in a variety of applications. These include downhole applications (e.g., drilling, fracturing, completions, oil production), use in conduits, containers, and/or other portions of refining applications, pipeline treatments, water disposal and/or treatments, and sewage disposal and/or treatments.

In certain embodiments of the present disclosure, treatment fluids and/or additives of the present disclosure may be introduced into a subterranean formation, a well bore penetrating a subterranean formation, tubing (e.g., a pipeline), and/or container using any method or equipment known in the art. Introduction of the treatment fluids and/or additives of the present disclosure may in such embodiments include delivery via any of a tube, umbilical, pump, gravity, and combinations thereof. The treatment fluids and/or additives of the present disclosure may, in various embodiments, be delivered downhole (e.g., into the wellbore) or into top-side flowlines/pipelines or surface treating equipment.

For example, in certain embodiments, treatment fluids and/or additives of the present disclosure may be applied to a subterranean formation and/or well bore using batch treatments, squeeze treatments, continuous treatments, and/or combinations thereof. In certain embodiments, a batch treatment may be performed in a subterranean formation by stopping production from the well and pumping a specific amount or quantity of a treatment fluids or additives into a well bore, which may be performed at one or more points in time during the life of a well. In other embodiments, a squeeze treatment may be performed by dissolving acrylonitrile, treatment fluids, or related additives in a suitable solvent at a suitable concentration and squeezing that solvent carrying the acrylonitrile or related compound(s) downhole into the formation, allowing production out of the formation to bring the acrylonitrile or related compound(s) to the desired location.

In still other embodiments, treatment fluids and/or additives of the present disclosure may be injected into a portion of a subterranean formation using an annular space or capillary injection system to continuously introduce the treatment fluid(s) and/or additive(s) into the formation. Other means and/or equipment that may be used to continuously inject treatment fluids and/or additives of the present disclosure into a well bore include, but are not limited to slip-stream systems, annulus drip systems, cap strings, umbilical strings, gas lift systems, continuous metering systems, subsurface hydraulic systems, bypass feeders, and the like.

In certain embodiments, such continuous injection equipment at a well site may be controlled from a remote location and/or may be partially or completely automated. In certain embodiments, a treatment fluid comprising acrylonitrile or related compounds of the present disclosure may be circulated in the well bore using the same types of pumping systems and equipment at the surface that are used to introduce treatment fluids or additives into a well bore penetrating at least a portion of the subterranean formation. In certain embodiments, acrylonitrile or related compounds of the present disclosure could be dried and formed into a solid for delivery into rat holes, tanks, and/or a wellbore.

Figure 3:
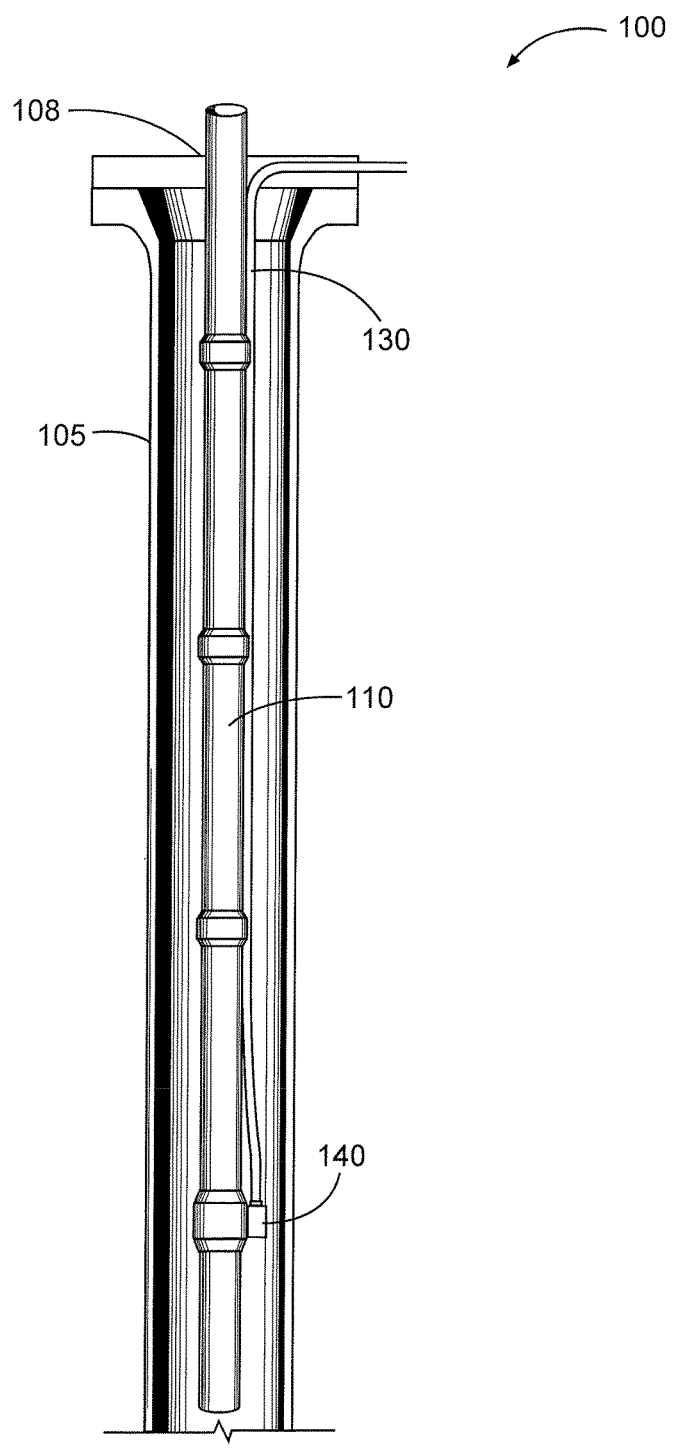
FIG. 3 is a diagram illustrating an injection system that may be used in accordance with certain embodiments of the present disclosure.

For example, acrylonitrile or related additives of the present disclosure may be introduced into a well bore using a capillary injection system as shown in FIG. 3. Referring now to FIG. 3, well bore 105 has been drilled to penetrate a portion of a subterranean formation 100. A tubing 110 (e.g., production tubing) has been placed in the well bore 105. A capillary injection tube 130 is disposed in the annular space between the outer surface of tubing 110 and the inner wall of well bore 105. The capillary injection tube 130 is connected to a side-pocket mandrel 140 at a lower section of the tubing 110. Treatment fluids and/or solutions comprising acrylonitrile or related additives may be injected into capillary injection tube 130 at the wellhead 108 at the surface (e.g., using one or more pumps (not shown)) such that it mixes with production fluid at or near the side-pocket mandrel 140. The system shown in FIG. 3 also may include one or more valves (not shown) at one or more locations along the capillary injection tube 130, among other reasons, to prevent flowback of fluid or gas to the surface through the tube. Other capillary injection systems and side pocket mandrel devices (e.g., those used in gas lift production) may be used in a similar manner to the system shown in FIG. 3.

In certain embodiments, an additive of the present disclosure may be added to a pipeline where one or more fluids enter the pipeline and/or at one or more other locations along the length of the pipeline. In these embodiments, the additive may be added in batches or injected substantially continuously while the pipeline is being used.

Examples

Table 1 below shows the results of an example test of one embodiment of the present disclosure. In this example, 150 mL of water containing 300 ppm hydrogen sulfide was adjusted to pH=8 in two sealed flasks. One sample was used as a control test without adding anything. The other was treated by a suitable amount of acrylonitrile solution (3%). This test was run at 55° C. After 3 h, the blank sample still contained 250 ppm H2S. The results of the one with acrylonitrile treatment are shown in Table 1.

TABLE 1

Results of acrylonitrile treatment at pH = 8

| Time (h) | $H_2S$ concentration (ppm) |
|---|---|
| 0 | 300 |
| 0.5 | 120 |
| 1 | 50 |
| 3 | <10 |

Table 2 below shows the results of an example test of one embodiment of the present disclosure. In this example, 150 mL of water containing 300 ppm hydrogen sulfide was adjusted to pH=10 in two sealed flasks. One sample was used as a control test without adding anything. The other was treated by a suitable amount of acrylonitrile solution (3%). This test was run at 55° C. After 2 h, the blank sample still contained 250 ppm H2S. The results of the one with acrylonitrile treatment are shown in Table 2.

TABLE 2

Results of acrylonitrile treatment at pH = 10

| Time (h) | $H_2S$ concentration (ppm) |
|---|---|
| 0 | 300 |
| 1 | <20 |
| 2 | 0 |

An embodiment of the present disclosure is a method comprising: providing a treatment fluid comprising a carrier fluid and an acrylonitrile-based additive; and introducing the treatment fluid into at least a portion of a subterranean formation where one or more sulfur species are present.

Another embodiment of the present disclosure is a method comprising: providing a treatment fluid comprising a carrier fluid and an acrylonitrile-based additive; and introducing the treatment fluid into at least a portion of a conduit or container where one or more sulfur species are present.

Another embodiment of the present disclosure is a method for scavenging a sulfur species from a sulfur-containing fluid, the method comprising: providing an additive comprising an acrylonitrile-based compound, and introducing the acrylonitrile-based compound into at least a portion of the sulfur-containing fluid.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
   providing a treatment fluid comprising a carrier fluid and an acrylonitrile-based additive;
   introducing the treatment fluid into at least a portion of a subterranean formation where one or more sulfur species are present; and
   allowing the acrylonitrile-based additive to interact with the sulfur species to reduce the amount of the sulfur species or inactivate at least a portion of the sulfur species present in the formation.

2. The method of claim 1 wherein the carrier fluid comprises an aqueous liquid.

3. The method of claim 1 wherein the treatment fluid has a pH level that is approximately neutral.

4. The method of claim 1 wherein the treatment fluid has a pH level that is at least 5.

5. The method of claim 1 wherein the acrylonitrile-based additive further comprises one or more acrylonitrile derivatives.

6. The method of claim 5 wherein the one or more acrylonitrile derivatives comprises an acrylonitrile derivative containing a side chain with sulfur scavenging functionality.

7. The method of claim 6 wherein the side chain is acrylate.

8. The method of claim 1 wherein the acrylonitrile-based additive is present in the treatment fluid in a concentration of from about 0.5% to about 15% by weight of the treatment fluid.

9. The method of claim 1, wherein the acrylonitrile-based additive comprises at least one compound selected from the group consisting of compounds having the general formula:

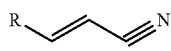

where R is an atom or functional group selected from the group consisting of a hydrogen atom, an alkyl group, an alkene group, an alkyne group, an ester group, an ether group, a carbonyl group, a carbonyl amide group, a urea group, a urethane group, and any combination thereof.

10. The method of claim 1 wherein the acrylonitrile-based additive does not comprise an acrylonitrile polymer or copolymer.

11. A method comprising:
providing a treatment fluid comprising a carrier fluid and an acrylonitrile-based additive;
introducing the treatment fluid into at least a portion of a conduit or container where one or more sulfur species are present; and
allowing the acrylonitrile-based additive to interact with the sulfur species to reduce the amount of the sulfur species or inactivate at least a portion of the sulfur species present in the conduit or container.

12. The method of claim 11 wherein the conduit or container comprises at least a portion of a refining system.

13. The method of claim 11 wherein the conduit or container comprises at least a portion of a pipeline.

14. The method of claim 11 wherein the conduit or container comprises at least a portion of a water or sewage disposal system.

15. The method of claim 11 wherein the acrylonitrile-based additive does not comprise an acrylonitrile polymer or copolymer.

16. A method comprising:
providing a treatment fluid comprising a carrier fluid and an acrylonitrile-based additive that does not comprise an acrylonitrile polymer or copolymer; and
introducing the treatment fluid into at least a portion of a subterranean formation where one or more sulfur species are present.

17. The method of claim 16 further comprising allowing the acrylonitrile-based additive to interact with the sulfur species to reduce the amount of the sulfur species or inactivate at least a portion of the sulfur species present in the formation.

18. The method of claim 16 wherein the treatment fluid has a pH level that is approximately neutral.

19. The method of claim 16 wherein the additive present in the treatment fluid in a concentration of from about 0.5% to about 15% by weight of the fluid.

20. The method of claim 16, wherein the additive comprises at least one acrylonitrile-based compound selected from the group consisting of compounds having the general formula:

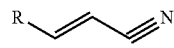

where R is an atom or functional group selected from the group consisting of a hydrogen atom, an alkyl group, an alkene group, an alkyne groups, an ester group, an ether group, a carbonyl group, a carbonyl amide group, a urea group, a urethane group, and any combination thereof.

* * * * *